Jan. 13, 1959 J. H. HOLLYDAY 2,868,114
PLUNGER CONTROL MEANS
Filed Feb. 23, 1956 2 Sheets-Sheet 2
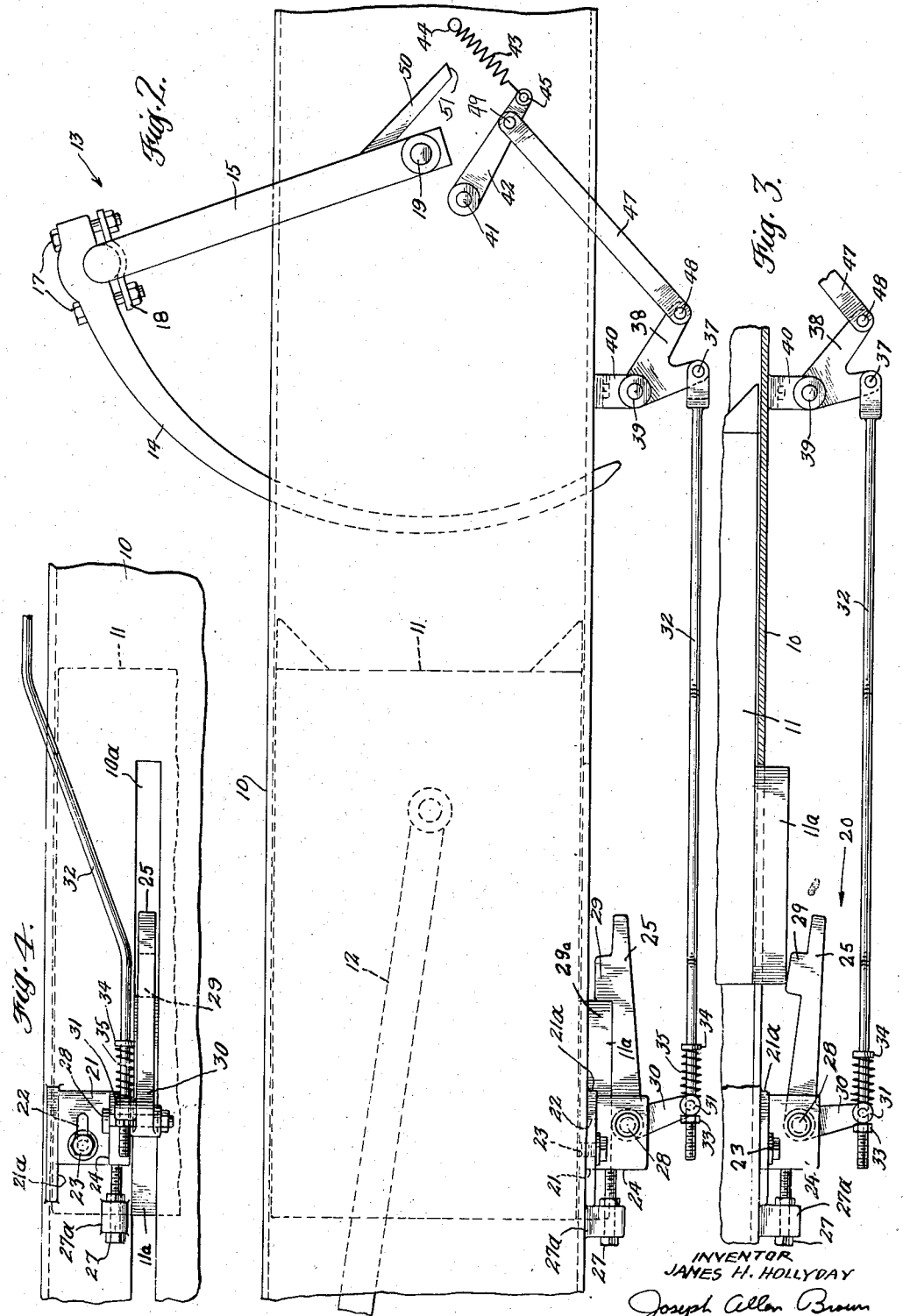
INVENTOR
JAMES H. HOLLYDAY
Joseph Allen Brown
ATTORNEY

United States Patent Office 2,868,114
Patented Jan. 13, 1959

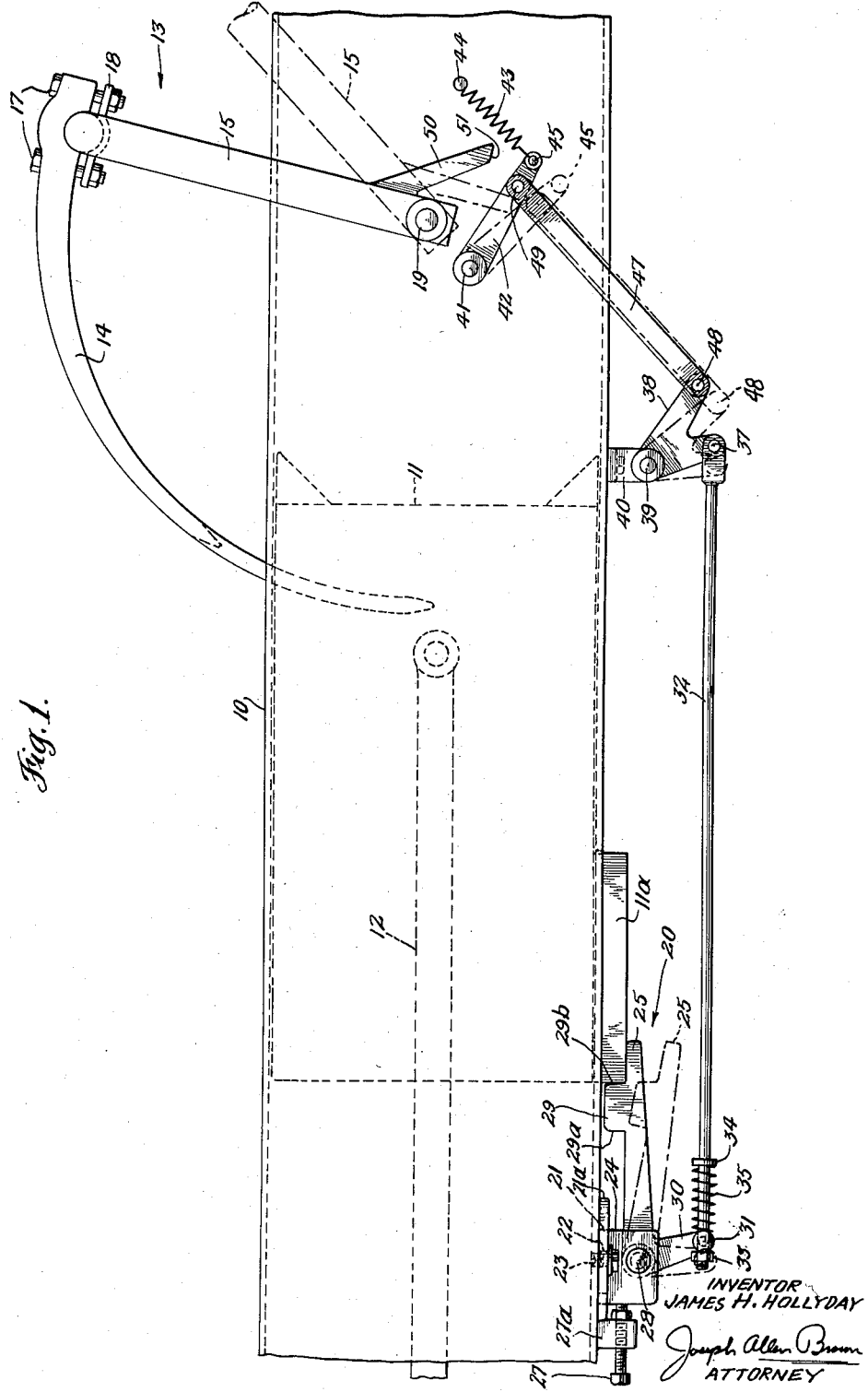

2,868,114

PLUNGER CONTROL MEANS

James H. Hollyday, New Holland, Pa., assignor to Sperry Rand Corporation, New Holland, Pa., a corporation of Delaware Application February 23, 1956, Serial No. 567,259

5 Claims. (Cl. 100—19)

The present invention relates generally to balers and more particularly to automatic balers in which hay, or other crop material, is picked up and fed into a bale casing and into the path of a plunger reciprocable in the casing. Still more specifically, the invention relates to control means for a baler plunger.

In certain types of automatic balers, the plunger is latched against each bale upon its completion to hold it under a compression force while a tying mechanism bands and ties the bale. The resultant bale is very compact and tightly tied. One draw-back to latching the plunger, however, is that the capacity of the baler is slightly decreased.

In other automatic balers, the plunger is allowed to reciprocate continuously, the tying of bales being synchronized with the reciprocating strokes of the plunger. The capacity of these balers is greater than comparable balers in which the plunger is stopped as each new bale is completed. However, the bales produced are not quite as compact or as tightly tied as the bales tied while being held by the plunger.

Operators who grow and bale hay for shipment to other locations, generally prefer the tighter bales because they are more adaptable to frequent and rough handling. Farmers who grow and bale hay for their own use, however, generally find that the bales produced in balers having a non-stop plunger are fully adequate for their purposes; and the high capacity of these balers is an appealing feature to them.

Balers presently on the market are either of the latch or no latch type. As far as is known, there is no baler designed and sold specifically for alternate use. However, it is common among skilled baler mechanics to adapt latch type balers for non-latch use. Such modification is possible, for example, on the baler shown in Nolt, U. S. Patent 2,236,628 issued April 1, 1941. Generally, this changeover from latching to non-latching is accomplished by removing the baler plunger latch or securing the latch in inoperative position and then adjusting the baler timing cycle whereby the needles operate in close synchronism with the bale forming plunger to move through the bale casing and return between successive actuations of the plunger at the completion of each bale.

The primary object of this invention is to provide plunger control means in an automatic baler operable with or without stopping the plunger during the tying cycle, the control means being adapted selectively, to serve either as a latch or safety catch for the plunger.

Another object of this invention is to provide control means of the character described in which a single part serves, selectively, as a safety catch or as a latch for the plunger.

A further object of this invention is to provide means of the character described controllable through the needle means of the tying mechanism of the baler.

A still further object of this invention is to provide control means of the character described which is of inexpensive, simple construction.

Other objects of this invention will be apparent hereinafter from the specification and from the recital in the appended claims.

In the drawing:

Fig. 1 is a plan view of a portion of an automatic baler having mounted thereon plunger control means constructed according to one embodiment of this invention, the control means being shown adjusted for latching of the plunger and the plunger being shown latched;

Fig. 2 is a plan view similar to Fig. 1 showing the plunger control means adjusted to serve as a safety-catch to normally permit uninterrupted reciprocation of the baler plunger, but to stop the plunger if it should advance on a working stroke before a banding operation has been completed, the control means being shown stopping the plunger;

Fig. 3 is a fragmentary view showing the plunger control means adjustable as in Fig. 2 and illustrating the position which the control means assumes when the plunger has delivered a final charge of hay and the tying mechanism has been actuated; and, Fig. 4 is a fragmentary side elevation of the control means.

An automatic hay baler is adapted to be towed across a field of cut and windrowed crop material, such as hay. It has pick-up means which automatically lifts the hay from the stubble and delivers it to an infeed mechanism. The infeed mechanism in turn feeds the gathered hay into a bale casing where it is compressed into bales by a reciprocating plunger. Upon completion of each bale, a mechanism is actuated to project bands of twine or wire around the bale and then to automatically tie the ends of the bands together. Subsequent to the banding and tying operation, the completed bales are ejected from the baler onto the ground or onto a trailing wagon.

The baler upon which the control means of this invention is adapted to be used is of the type in which the operation of the needles of the tying mechanism is adapted to be timed with the reciprocating movements of the bale plunger so that the tying of a bale may take place with or without stopping the reciprocating plunger.

In the drawings, only the parts necessary for an understanding of applicant's invention are shown. For clarity, all other related parts of the baler have been omitted.

Referring now to Fig. 1, 10 indicates the bale casing of an automatic baler. Reciprocable in the casing to compress hay fed through an opening (not shown) in the casing is a plunger 11. Plunger 11 is provided with a laterally projecting lug or abutment 11a which projects through an elongated slot 10a (Fig. 4) in the bale case. The plunger is reciprocated by a rod 12 driven from a power source, not shown. Rod 12 is connected to the power source through a telescopic linkage similar to that shown in Nolt, 2,236,628, issued April 1, 1941. If the plunger is latched upon completion of a new bale, the driving connection between plunger rod 12 and the power source is released. When the plunger is unlatched, the drive is again operative to reciprocate the plunger.

Pivotally mounted on bale casing 10 is a needle mechanism 13 operative in time with a banding mechanism, not shown, actuated through bale growth responsive means, also not shown. Mechanism 13 comprises needles 14 adapted to be projected through conventional slots (not shown) in the bale casing and in plunger 11 to feed a tying medium around the end of a bale newly formed in the casing and into the banding mechanism. Needle mechanism 13 includes a yoke 15 on which needles 14 are carried, the needles being connected to the yoke by means of bolts 17 and brackets 18. The opposite ends of yoke 15 extend on opposite sides of the bale casing 10 and are supported on bearings 19 carried on the bale casing. As previously stated, needles 14 operate in time with the reciprocating strokes of plunger 11 so that the needles may be suitably actuated in a tying operation even though the plunger be reciprocated continuously.

Mounted on bale casing 10, on one side wall thereof, is a plunger control mechanism 20 operative, selectively, either to stop the plunger upon completion of each bale to hold the bale under compression while it is tied, or normally operative to allow free reciprocation of the plunger, but to function as a catch or stop for the plunger if the plunger moves on a working stroke while needles 14 are still in the bale casing.

Mechanism 20 comprises a support bracket 21 adjustably mounted on bale case 10. The upper edge of bracket 21 is slideable against a guide lug 21a welded to the bale case to keep this upper edge parallel to the top of the bale case. Bracket 21 has an elongated slot 22 through which a bolt 23 extends for affixing the bracket to the bale casing. It will be apparent that on loosening bolt 23, bracket 21 can be adjusted forwardly or rearwardly on the bale casing. Bracket 21 has an outwardly projecting ear 24 on which a control member 25 is pivotally mounted. Engaging a side marginal edge of ear 24 is an adjustment bolt 27 threadably mounted in a support 27a welded or otherwise secured to the bale casing. Bolt 27 is operative in cooperation with bolt 23 to position and hold bracket 21 in a desired position.

Control member 25 is pivoted at 28 to ear 24. It is provided with a protuberance 29, the forward edge 29a of which is adaptable to serve as a plunger catch or stop and the rear edge 29b of which is adaptable to serve as a latch. The manner in which member 25 is operable will be hereafter described.

Member 25 has a right-angle portion 30 slideably connected at 31 to a rod 32. Threadably mounted on the forward end of rod 32 is a nut 33 which holds portion 30 of member 25 from sliding off the rod. Fixedly mounted on rod 32 is a ring 34 spaced from nut 33. Interposed between ring 34 and portion 30 of member 25 is a spring 35 provided so that any pivotal movement imparted to member 25 through rod 32 will be spring cushioned.

The end of rod 32 remote from member 25 is pivotally connected at 37 to a bell crank 38. Bell crank 38 is pivotally supported at 39 on a bracket 40 bolted or otherwise affixed to bale casing 10. Pivotally connected to bale case 10 at 41 is a lever arm 42, which is biased in a counter-clockwise direction by a spring 43 affixed at one end 44 to the bale case and at its opposite end 45 to arm 42.

Interposed between bell crank 38 and arm 42 is a link 47 pivotally connected at 48 to the crank and medially pivotally connected at 49 to the arm.

Suitably fixedly connected to yoke 15 and moveable therewith is an angular abutment member 50 having an end face 51 adapted to engage arm 42 when needles 14 are in retracted position (dotted lines, Fig. 1) to pivot arm 42 in a clockwise direction and against the tension of spring 43.

When mechanism 20 is adjusted rearwardly as shown in Fig. 1, plunger control member 25 serves as a latch, and operates as follows:

As a bale is being formed in casing 10, needle mechanism 13 is retracted. Abutment 50 is in engagement with arm 42 holding it in clockwise position against the counter-clockwise pull of spring 43. Member 25 assumes the position shown in dotted lines, being pivoted away from casing 10 through linkage 32, 38 and 47 connected to arm 42. All the while, plunger 11 is reciprocating to compress the charges of hay as they are fed into the bale casing.

Upon completion of the bale and the ramming of the final hay charge by plunger 11, bale growth responsive means, such as a conventional star wheel, trips the tying mechanism of the baler. Needle mechanism 13 is actuated and the needles 14 are projected through the bale case and through the slots in the plunger to deliver a tying medium around the rear end of the bale and deposit it in a tier, not shown. Simultaneously, abutment 50 is moved away from arm 42 and spring 43 swings the arm counter-clockwise about point 41. The movement of arm 42 is transmitted through 47, 38, 32 and 30 to pivot control member 25 toward the bale case thereby latching plunger 11 and preventing it from retracting. It will be seen from Fig. 1 that the rear face 29b of member 25 engages the plunger lug 11a.

After the tying medium is laid in the tier, not shown, needles 13 are retracted. Abutment 50 reengages arm 42 swinging it clockwise and thereby unlatching plunger 11. Plunger 11 then retracts and prior to its delivery of the first charge of hay for the new bale, the tying cycle is completed.

This sequential operation is repeated over and over with the plunger being latched each time a new bale is completed and tied.

If the baler is operated without stopping the plunger, mechanism 20 is adjusted forwardly by the operator, as shown in Figs. 2, 3 and 4. As a bale is being formed in casing 11 needle mechanism 13 is retracted. Abutment 50 holds arm 42 in clockwise position and control member 25 pivoted away from casing 10. Plunger 11 reciprocates freely. When plunger 11 delivers the final charge of hay to complete the bale, the tying mechanism is tripped, as previously stated, and needles 13 project a tying medium through the bale case and plunger and into a tier. When needles 13 are in the bale case, member 25 is pivoted toward the bale case. However, due to its position of adjustment, front face 29b of protuberance 29 of member 25 is unable to latch the plunger (Fig. 3). The protuberance, therefore, merely slides over lug 11a on the plunger and the plunger is able to retract.

Under normal conditions needles 14 will be out of the bale case and the tying operation completed before plunger 11 delivers the next charge of hay for a new bale; and, member 25 will be pivoted out of the way of lug 11a. However, if for some reason the synchronized timing between needles 14 and the plunger gets out of phase and the needles are still in the bale case, member 25 will be in the position shown in Fig. 2 and as plunger 11 comes rearwardly its lug 11a will strike front face 29a of protuberance 29 of member 25 and the plunger will be stopped. It will be understood, of course, that shear bolt or similar means will be provided in the plunger drive means to break the plunger drive when the plunger is stopped by member 25. It will thus be seen that while member 25 is no longer able to act as a plunger latch when adjusted rearwardly, it now serves as a plunger safety catch.

Applicant, by his invention, has provided a latch-catch member having simple control means, the member when adjusted in one position serving to latch the bale plunger at the completion of each bale and during the tying cycle, and when adjusted to another position normally permitting free reciprocation of the bale plunger but serving as a safety catch therefor should the timing of the plunger get out of phase.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the inventions pertain, and as fall within the scope of the invention or the limits of the appended claims.

Having thus described my invention, what I claim is:

1. In an automatic baler having a bale case, a plunger reciprocable in said bale case, and normally inoperative banding means, including needle means, synchronized with said plunger for forming bands around completed bales, the combination of a control member pivotally mounted on said bale case and adjustable to two positions thereon, said control member when pivoted in either of said two positions being engageable with said plunger, means biasing said control member toward pivoted position, releasable means regulated by said needle means normally holding said biasing means inoperative, said releasable means being released on actuation of said needle means whereby said control member is pivoted by said biasing means, said control member when pivoted in one position of adjustment locking said plunger in extended position and when pivoted in the other position of adjustment acting as a safety stop for the plunger.

2. In an automatic baler, a bale case, a plunger reciprocable in said bale case, banding means synchronized with said plunger for forming bands around completed bales, said banding means including oscillatable needle means movable from a position outside said bale case to a position projecting across the bale case and across the path of reciprocation of said plunger, and control means operable selectively to latch said plunger in an extended position or to stop the plunger as it moves toward extended position, said control means being operable responsive to operation of said needle means and comprising an abutment on said plunger, a control member mounted on said bale case and adjustable to two positions thereon, said control member being movable toward and away from said bale case in either position of adjustment and when moved toward the bale case in one position being engageable with one end of said abutment to latch said plunger, and when moved toward the bale case in the other position of adjustment being engageable with an opposite end of said abutment to stop said plunger, and means interconnecting said control member and said needle whereby the control member is moved toward the bale case on movement of the needle means to a position projecting across said bale case.

3. In an automatic baler, a bale case, a plunger reciprocable in said bale case, banding means synchronized with said plunger for forming bands around completed bales, said banding means including oscillatable needle means movable from a position outside said bale case to a position projecting across the bale case and across the path of reciprocation of said plunger, and control means operable selectively to latch said plunger in an extended position or to stop the plunger as it moves toward extended position, said control means being operable responsive to operation of said needle means and comprising an abutment on said plunger, a control member pivotally mounted on said bale case and adjustable to two positions thereon, said control member when pivoted toward said bale case in one position of adjustment being engageable with one end of said abutment to latch the plunger and when pivoted toward the bale case in the other position of adjustment being engageable with the opposite end of said abutment to stop said plunger, means biasing said control member for pivotal movement toward said bale case, and means on said needle means for holding said control member pivoted away from said bale case when the needle means is outside said bale case, said holding means being released upon projection of said needle means across said bale case.

4. In an automatic baler as recited in claim 2 wherein said bale case has a side wall formed with a slot therein through which said abutment projects, said control member being pivotally mounted on said side wall adjacent said slot and being adjustable parallel to said side wall to either of said two positions, and means for locking said control member in adjusted position.

5. In an automatic baler as recited in claim 4 wherein said control member is manually adjustable, and means interconnecting said control member and needle means being such that when said needle means is operated said control member is pivoted.

References Cited in the file of this patent
UNITED STATES PATENTS

| | | |
|---|---|---|
| 1,111,819 | Barker | Sept. 29, 1914 |
| 1,671,966 | Burkholder | June 5, 1928 |
| 2,236,628 | Nolt | Apr. 1, 1941 |
| 2,396,720 | Nolt | Mar. 19, 1946 |
| 2,651,252 | Pope | Sept. 8, 1953 |